United States Patent [19]

Hitt

[11] 4,450,737

[45] May 29, 1984

[54] LATHE TOOL

[76] Inventor: Dale Hitt, 20850 Westhaven, Southfield, Mich. 48075

[21] Appl. No.: 230,262

[22] Filed: Jan. 30, 1981

[51] Int. Cl.³ .......................... B23B 5/38; B23B 21/00
[52] U.S. Cl. ...................................... 82/24 R; 82/1.4; 82/34 R
[58] Field of Search ............. 82/1.2, 1.4, 34 R, 36 A, 82/36 R, 17, 16, 24 R; 29/57

[56] References Cited

U.S. PATENT DOCUMENTS

| | | | |
|---|---|---|---|
| 377,080 | 1/1888 | Lindner | 29/45 |
| 1,158,753 | 11/1915 | Waite | 82/24 R |
| 1,211,183 | 1/1917 | Kulenkampff . | |
| 1,232,801 | 7/1917 | Hjorth . | |
| 1,260,271 | 3/1918 | Kramer . | |
| 1,951,488 | 3/1934 | Newton . | |
| 2,028,293 | 1/1936 | O'Brien et al. . | |
| 2,157,248 | 5/1939 | Swanson | 82/1.4 |
| 2,303,106 | 11/1942 | Baurhenn | 82/34 R |
| 2,330,156 | 9/1943 | Stoen | 82/24 A |
| 2,505,584 | 4/1950 | Schotthoefer | 409/304 |
| 2,783,664 | 3/1957 | Johnson . | |
| 2,841,039 | 7/1958 | Stastny | 82/24 R |
| 3,417,478 | 12/1968 | Jeanneret . | |
| 3,473,207 | 10/1969 | George . | |
| 3,733,925 | 5/1973 | Schmidt et al. | 82/24 A |
| 4,041,812 | 8/1977 | Jioio et al. . | |

Primary Examiner—Leonidas Vlachos
Attorney, Agent, or Firm—Harness, Dickey & Pierce

[57] ABSTRACT

This disclosure relates to a lathe tool for use with a conventional lathe having a generally horizontal bed and a workpiece mounted above the bed and rotatable about an axis generally parallel to the bed. The lathe tool of the present invention includes mounting means for supporting a lever which is pivotally attached to both the mounting means and a reciprocable shaft which has cutting tool holding means on one end thereof. The lever is used to move a cutting tool into engagement with a workpiece to perform such lathe operations as taper turning, taper boring, or the like.

9 Claims, 6 Drawing Figures

LATHE TOOL

BACKGROUND AND SUMMARY OF THE INVENTION

This invention relates generally to lathe tools, and more particularly to lathe tools which are mountable on lathe beds to perform such lathe operations as taper turning, taper boring, or the like.

Lathe tools currently used with conventional horizontal bed lathes are typically mounted on a lathe compound, which is a multi-piece, turntable-like device mounted on a lathe carriage. The lathe carriage, which extends transversely across the lathe bed, is typically movable longitudinally along the lathe bed. The lathe compound is typically adapted to receive various cutting tool holders and associated cutting tools, via either bolt-on attachment or "quick-change" mounting attachment. The lathe compound is adjustable transversely of the lathe bed via cross-slide adjustment on the lathe carriage and is rotatably adjustable with respect to a workpiece mounted on the lathe spindle via various controls on the compound. However, such rotating or transverse adjustment, although generally accurate, is somewhat awkward, cumbersome, and slow. And in this regard, in addition to the obvious disadvantages of complexity and awkwardness, it poses the disadvantage of not enabling the efficient and economic manufacture of the production quantities necessary for a profitable operation.

For example, in order to perform a taper turning operation on the conventional lathe compound and carriage arrangement referred to above, it would first be necessary to mount the cutting tool holder and associated cutting tool on the lathe compound. Then the necessary adjustments would have to be made to the lathe compound, cross-slide, and carriage so as to align the cutting tool for the first cut. After the first cut has been made, then the tailstock feed and/or the compound feed would be used to advance the cutting tool to the next cut. For each cut, however, simultaneous adjustment of the longitudinal, transverse, and angular orientation of the cutting tool with respect to the workpiece would be necessary. Needless to say, such simultaneous adjustment is a very difficult manual exercise, and furthermore almost requires the skill of a mathematician well versed in trigonometry and geometry for simultaneous adjustment of the various angles and orientations involved.

Accordingly, it is a principal object of the present invention to provide an improved lathe tool, which in addition to being easily mounted on a conventional lathe bed, provides for simple and rapid control of many lathe operations.

In general, the lathe tool according to the present invention comprises mounting means including two spaced-apart generally parallel surfaces adapted for engagement with conventional clamping means secured over the bed of a lathe. A relatively elongated member or shaft member having tool holding means on one end thereof is provided and is reciprocable with respect to a body portion of the mounting means towards and away from the workpiece. Lever means pivotally attached to both the mounting means and the shaft member is also provided. The resulting pivoting linkage arrangement enables relatively simple and rapid movement and control of a cutting tool into engagement with a workpiece to perform such lathe operations as taper turning, taper boring, or the like.

Additional advantages and features of the present invention will become apparent from a reading of the detailed description of the preferred embodiment which makes reference to the following set of drawings in which:

DESCRIPTION OF THE PREFERRED EMBODIMENT

Figure 1:
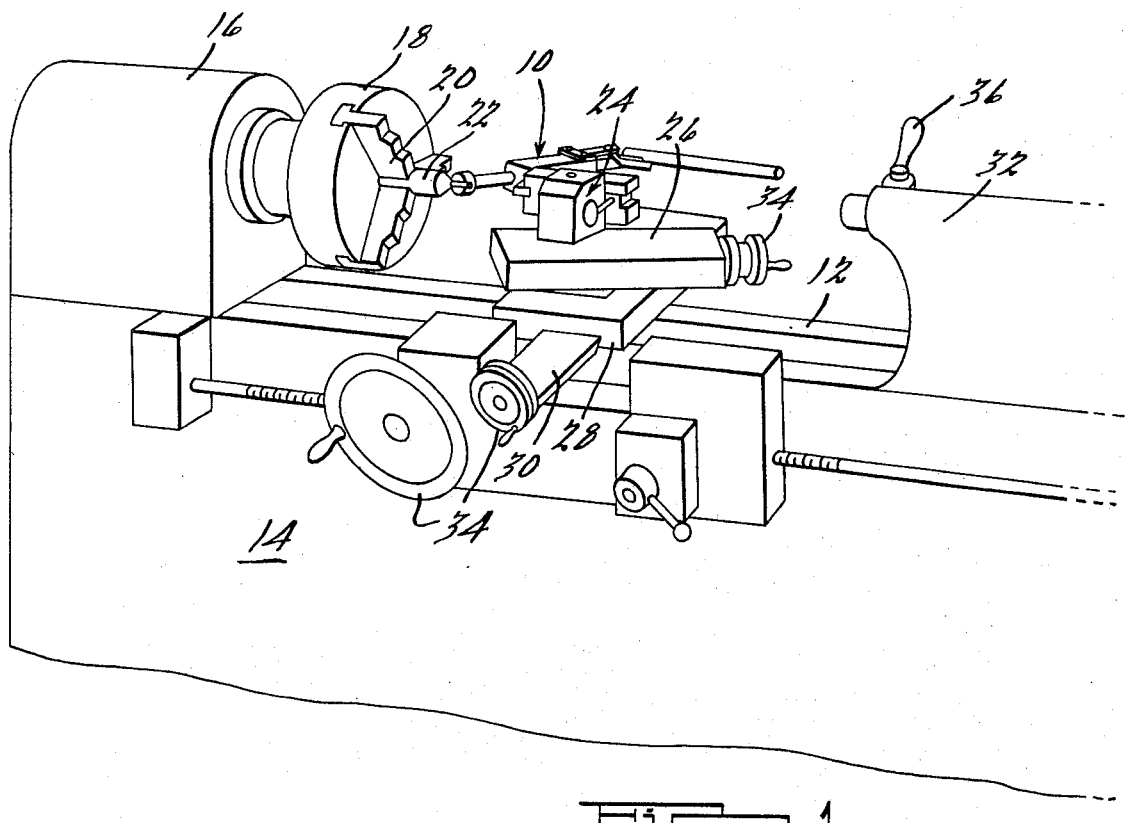
FIG. 1 is a side perspective view of a conventional lathe bed with the lathe tool of the present invention shown mounted thereon.

Referring now to the drawings wherein the showings are for the purpose of illustrating a preferred embodiment of the present invention and are not for the purpose of limiting the invention, FIG. 1 shows a lathe tool 10 made in accordance with the present invention mounted on the bed 12 of a conventional lathe 14. As shown, the lathe 14 includes a headstock 16 which supports and transmits rotational motion to spindle 18 and associated chucks 20. The chucks 20 grip workpiece 22 during rotational movement of the spindle 18 so that a cutting tool mounted on the lathe tool 10 of the present invention may be used to engage the workpiece 22. The lathe tool 10 is shown mounted in a "quick change" tool configuration 24, which in turn is mounted on a compound 26 over the lathe bed 12. The compound 26 is in turn mounted on carriage 28 and cross-slide 30 over the lathe bed 12. A tailstock 32 is provided at the other end of the lathe 14 opposite the headstock 16. As shown, various adjustment wheels 34 and levers 36 are provided on such a conventional lathe to enable adjustment of the various components referred to above.

Figure 2:
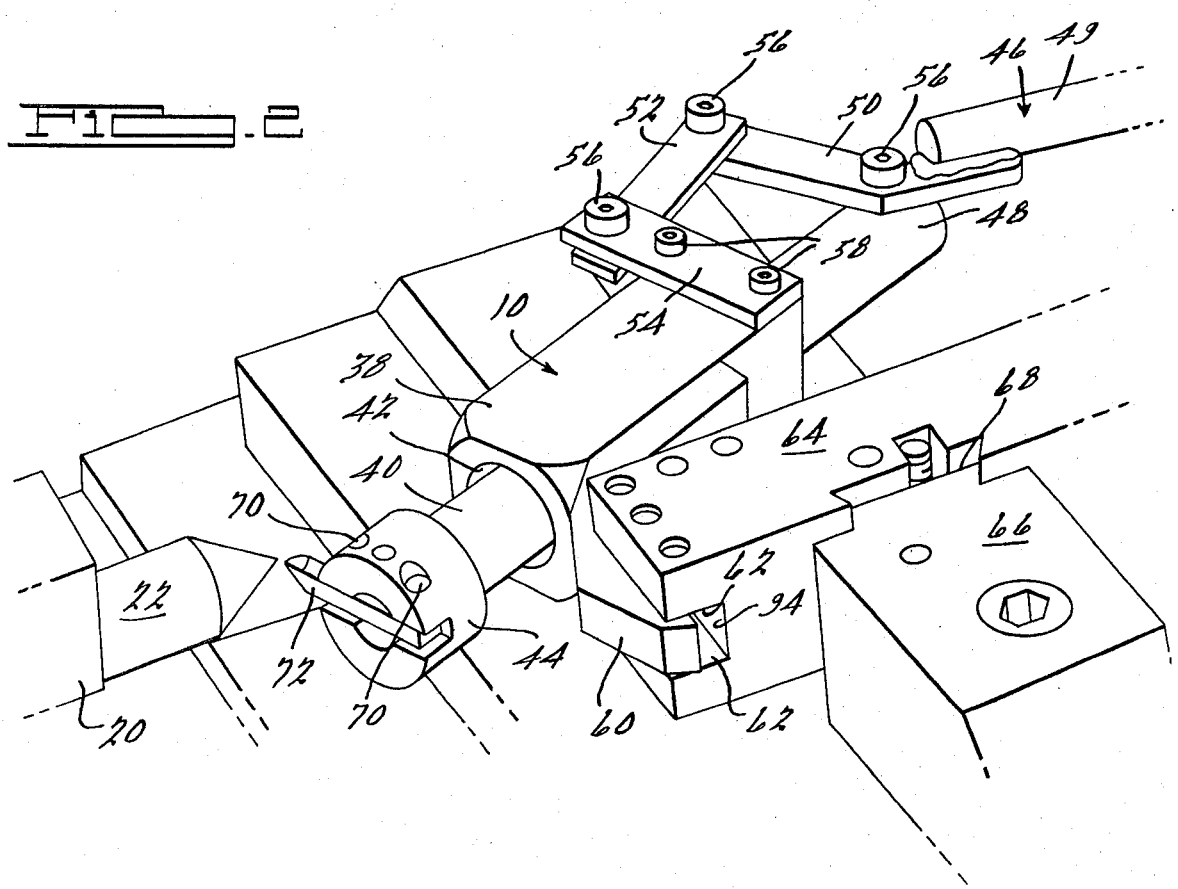
FIG. 2 is an enlarged side perspective view of the lathe bed of FIG. 1 showing the lathe tool of the present invention.

Referring now to FIG. 2, an enlarged view of the lathe tool 10 made in accordance with the present invention is shown. The lathe tool comprises mounting means including a body portion 38 which contains a relatively elongated member or shaft member 40 therein. The shaft member 40 extends through an aperture 42 in the body 38 and contains tool holding means 44 on one end and is pivotally attached to lever means 46 on its other end 48. Lever means 46 includes and is connected to the body 38 via lever handle 49, elbow link 50, straight link 52, and plate 54. Shoulder bolts 56 are provided at the various pivot points along the links 50 and 52, and the plate 54, with the plate 54 being secured to the body 38 via cap screws 58. Cap screws 58 may be eliminated by brazing plate 54 to the body 38, either in the configuration shown in FIG. 2, or by shortening plate 54 and brazing it to the side of body 38.

The mounting means including body 38 also includes a generally L-shaped clamping member or mounting member 60 which is attached to the body 38, and which is clamped between two spaced-apart, generally parallel surfaces 62 within clamping block 64. Clamping block 64 is secured to mounting block 66 via a vertical dovetail configuration 68 as shown in FIG. 2. Tool holding mean 44 includes set screws 70 for engaging and retaining cutting tool 72. Operation of the lathe tool 10 of the present invention by moving the lever handle 49 back and forth as necessary, moves the cutting tool 72 into and out of engagement with workpiece 22 which is secured by chuck 20. FIG. 2 shows non-coaxial engagement with the workpiece. It is also contemplated that elbow link 50 may be bent upwardly between intermediate shoulder bolt 56 and the point of attachment of the lever handle 49, to provide an upward handle orientation.

Figure 3:
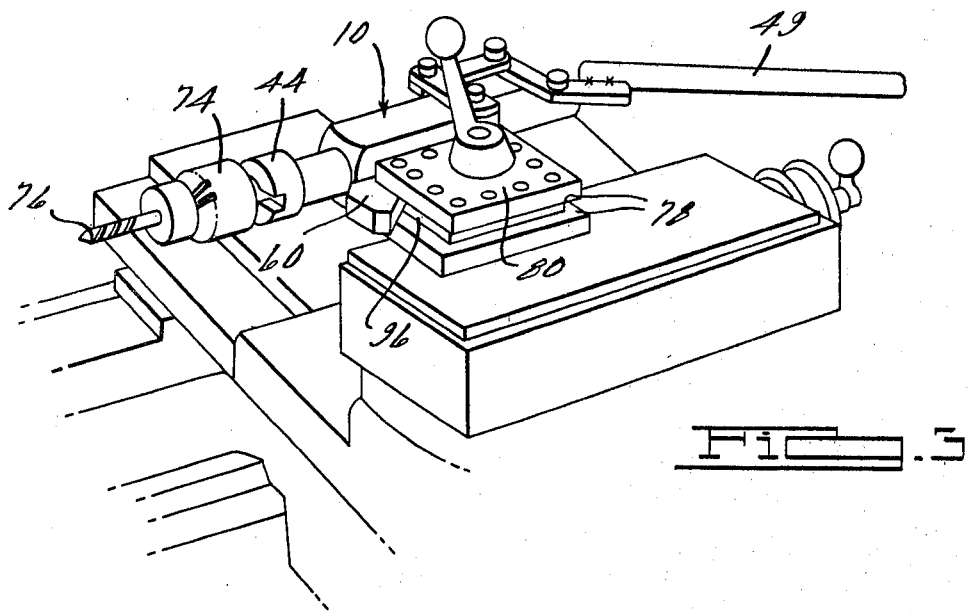
FIG. 3 is a side perspective view of an alternate mounting arrangement usable with the lathe tool of the present invention.

FIG. 3 shows an alternate use of the lathe tool 10 of the present invention wherein rather than the cutting tool of FIGS. 1 and 2, tool holding means 44 is shown as engaging and retaining chuck assembly 74. The chuck assembly 74 includes a drill or boring bit 76 which may be used for drilling or boring in the subject workpiece. In addition, FIG. 3 shows the clamping member or mounting member 60 clamped between two spaced-apart, generally parallel surfaces 78 within clamping block 80. Clamping block 80 differs from the clamping block 64 and associated mounting block 66 referred to in connection with FIG. 2 in that no vertical dovetail mounting arrangement is provided. Clamping block 80 is commonly referred to as a square or box turret. It has been found that both the mounting arrangements of FIGS. 2 and 3 provide adequate clamping support for the lathe tool 10 of the present invention.

Figure 4:
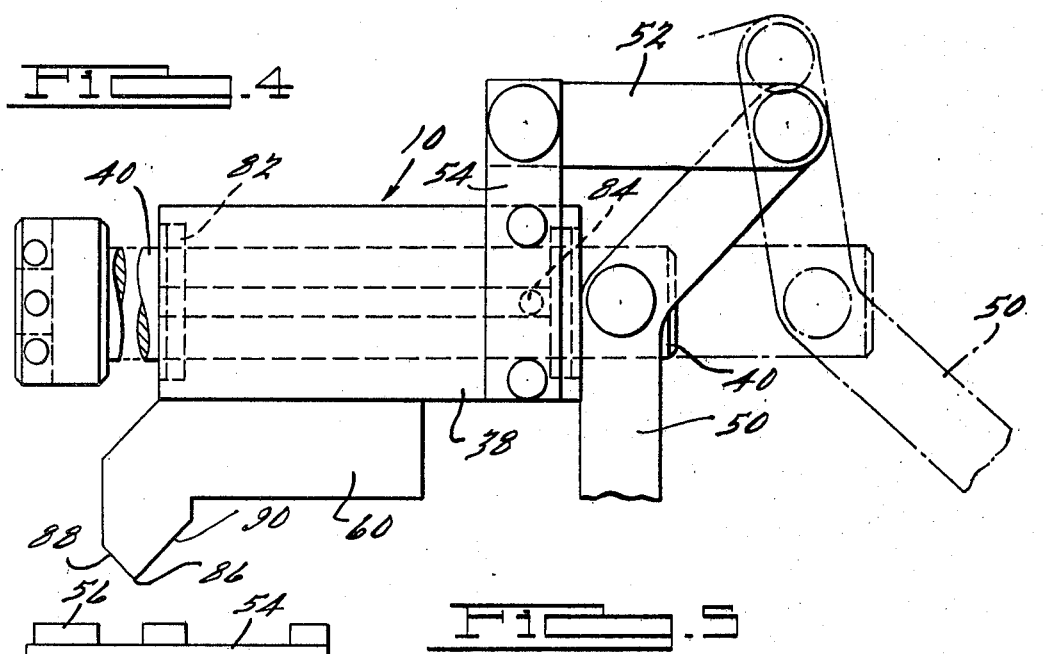
FIG. 4 is plan view of a lathe tool of the type shown in FIGS. 1 to 3 made in accordance with the present invention.
Figures 5, 6:
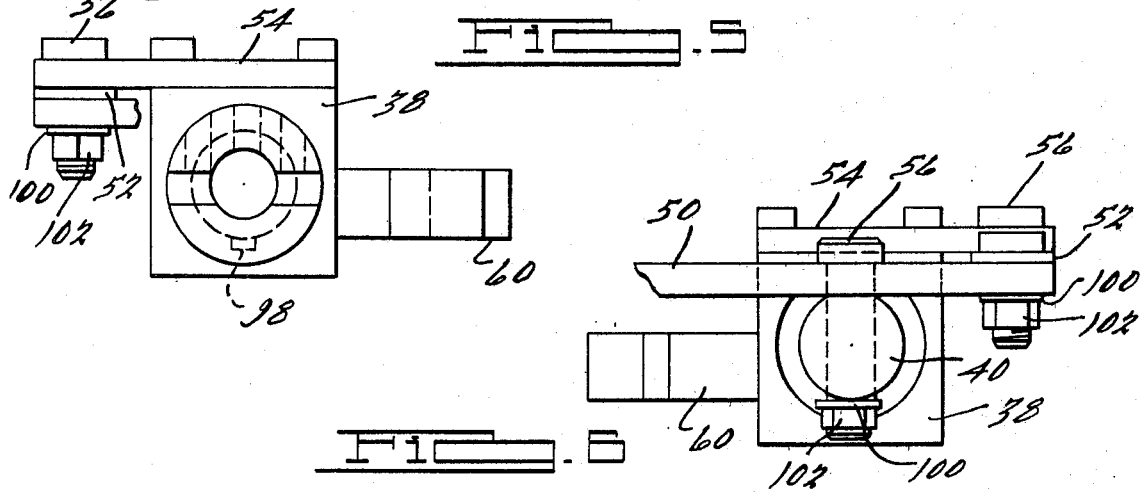
FIG. 5 is an end view of the lathe tool of FIG. 4 taken along the tool holding means end of the lathe tool.
FIG. 6 is an end view of the lathe tool of FIG. 4 taken along the lever means end of the lathe tool.

FIG. 4 is a plan view of the lathe tool 10 shown in FIGS. 1 to 3. In addition to the description of the various parts of the tool provided hereinabove in connection with FIGS. 1, 2, and 3, this figure shows an oil seal 82 which is provided adjacent the face of the aperture through which shaft member 40 extends. A guide pin 84 is also provided within the body 38 to keep the shaft member 40 from slipping out of the body 38 and to prevent rotation of shaft member 40. As best shown in FIG. 5, the guide pin 84 travels within a central keyway 98 within the aperture of body 38. Shaft member 40, as shown in FIG. 4, has a stroke of between about two and a half to three inches from a retracted position as designated by elbow link 50 being pulled back (shown in phantom lines), to an extended or operating orientation in which elbow link 50 is adjacent the body 38. Of course, the stroke may be varied to suit a particular need by simply changing the length of the shaft member 40 and then enlarging and/or repositioning the linking members and pivot points as necessary.

FIG. 4 also shows the mounting member 60 in slightly more detail than referred to above. In addition to being generally L-shaped with a longitudinal portion attached to the body 38 and a transverse portion extending away from the body 38, the mounting member 60 also has a pointed forward end 86 formed by the intersection of outer forward face 88 and inner forward face 90. It has been found that forming inner forward face 90 at an angle of about 45° relative to clamping face 92 allows for secure adjustment of the mounting member 60 within various clamping blocks (64 and 80 referred to above). Needless to say, infinite angular adjustment of the inner forward face 90 and clamping face 92 vis-a-vis the mounting member 60 is possible with secure engagement of a portion of either or both of the longitudinal and transverse portions of the mounting member 60 interposed between the upper and lower clamping surfaces 62 and 78 in FIGS. 2 and 3, respectively. This is because in addition to the two space-apart, generally parallel surfaces within each of these clamping blocks, an inner vertical wall within each of these clamping blocks contacts the inner forward face 90 and clamping face 92. In FIG. 2, the inner vertical wall is designated as 94, and in FIG. 3 it is designated as 96.

In addition to the central keyway 98, FIG. 5 also more clearly shows the relative sizes of body 38 and mounting member 60. A flat washer 100 and nut 102 are provided to pivotally connect shoulder bolt 56 to plate 54 and straight link 52. FIG. 6 shows similar use of shoulder bolts 56, flat washers 100, and nuts 102. Elbow link 50 is shown pivotally connected to straight link 52 by one bolt at its upper end, and is shown pivotally connected to shaft member 40 intermediate its length. As shown in FIG. 4, elbow link 50 is attached near the end of shaft member 40.

Among the advantages of the present invention, in addition to those described hereinabove, is that an improved lathe tool is provided which is easily mounted on a conventional lathe bed and which also provides for simple and rapid control of many lathe operations such as taper turning, taper boring, or the like. The lathe tool of the present invention makes such lathe operations easier to visualize and carry out. Since the lathe tool of the present invention in effect combines the various adjustments previously done by the tailstock feed, carriage, and compound feed, these various feed adjustments are eliminated in place of the simple movement of the lever or handle on the present lathe tool, supplemented by utilizing the cross-slide feed on the lathe bed to advance the tool to the next cut. Also, due to the fact that the lathe tool of the present invention is adaptable to conventional "quick change" tooling or a conventional square or box turret, it is easily usable on most conventional lathe beds without requiring any significant modifications. When made using conventional hard or tool steels, a durable device is provided. In addition, and although not described above, the present lathe tool may also be used to cut keyways in workpieces.

While it will be apparent that the preferred embodiment of the invention disclosed is well calculated to fulfill the objects above stated, it will be appreciated that the invention is susceptible to modification, variation, and change without departing from the proper scope or fair meaning of the subjoined claims.

What is claimed is:

1. A lathe tool for use on a lathe having a generally horizontal bed, clamping means mounted on said horizontal bed and having a pair of spaced-apart clamping surfaces, and means for supporting a workpiece above the bed for rotation about an axis generally parallel to the bed, said lathe tool comprising:

mounting means including a longitudinally-extending body portion and an L-shaped mounting member having a longitudinal portion secured to said body portion of said lathe tool and a transverse portion extending away from both said body portion and said longitudinal portion and extending generally toward said clamping means, said longitudinal portion and said transverse portion each having two spaced-apart generally parallel surfaces adapted for engagement between said clamping means, said parallel surfaces on each of said longitudinal and transverse portions further being adapted to be engaged by said clamping means at varying locations on said parallel surfaces in order to allow adjustment of the angular orientation of the mounting member relative to said clamping means and relative to said workpieces; and tool holding means connected to said body portion for reciprocable movement relative thereto, and means for reciprocably moving said tool holding means relative to said body portion toward and away from the workpiece.

2. The invention of claim 1 wherein said two spaced-apart, generally parallel surfaces are generally horizontal.

3. The invention of claim 1, wherein an end of said transverse portion oriented away from said body portion has a generally vertical inner face sloping generally away from said clamping means in order to allow said adjustment of said angular orientation, one of said longitudinal and transverse portions being rotated toward said clamping means and the other of said longitudinal and transverse portions being rotated away from said clamping means when said angular orientation is adjusted, a portion of either or both of said parallel surfaces being engaged between said clamping means at various selected adjusted angular orientations of said mounting member.

4. The invention of claim 3 wherein said generally vertical inner face is formed at an angle of about 45° relative to said longitudinal and transverse portions.

5. The invention of claim 3 wherein said end of said transverse portion of said L-shaped mounting member also has a generally vertical outer face portion disposed at an angle relative to said longitudinal and transverse portions, said generally vertical inner and outer faces intersecting each other.

6. The invention of claim 1, wherein said tool holding means further includes a shaft member extending through an opening in said body portion for reciprocable movement toward and away from the workpiece, and lever means pivotally attached to both said body portion and said shaft member for moving said tool holding means toward and away from the workpiece, said lever means including a handle attached to an first link, said first link being pivotally connected to a second link, and said second link being pivotally connected to a plate which is fixedly attached to said body portion, said first link further being pivotally attached to said shaft member so that pivotal movement of said handle reciprocably moves said shaft member toward and away from said workpiece, the direction of said reciprocable movement being adjustable by said adjustment of said angular orientation of said mounting member relative to said clamping means and relative to said workpiece.

7. The invention of claim 6, wherein said lathe tool includes means for securing a cutting tool to said shaft member, said shaft member being adapted for either coaxial or non-coaxial engagement or said cutting tool with the workpiece in response to corresponding adjustment of said angular adjustment of said mounting member.

8. The invention of claim 6 wherein said shaft member has a reciprocable stroke of about two and a half inches.

9. A lathe tool for use on a lathe having a generally horizontal bed, clamping means mounted on said horizontal bed and having a pair of spaced-apart clamping surfaces, and means for supporting a workpiece above the bed for rotation about an axis generally parallel to said bed, said lathe tool comprising:

mounting means including a longitudinally-extending body portion and an L-shaped mounting member having a longitudinal portion secured to said body portion of said lathe tool and a transverse portion extending away from both said body portion and said longitudinal portion and extending generally toward said clamping means, said longitudinal portion and said transverse portion each having two spaced-apart generally parallel surfaces adapted for engagement between said clamping means, said parallel surfaces on each of said longitudinal and transverse portions further being adapted to be engaged by said clamping means at varying locations on said parallel surfaces in order to allow adjustment of the angular orientation of the mounting member relative to said clamping means and relative to said workpieces;

tool holding means connected to said body portion for reciprocable movement relative thereto, and means for reciprocably moving said tool holding means relative to said body portion toward and away from the workpiece; and an end of said transverse portion oriented away from said body portion having a generally vertical inner face sloping generally away from said clamping means in order to allow said adjustment of said angular orientation, one of said longitudinal and transverse portions being rotated toward said clamping means and the other of said longitudinal and transverse portions being rotated away from said clamping means when said angular orientation is adjusted.

* * * * *

UNITED STATES PATENT AND TRADEMARK OFFICE
CERTIFICATE OF CORRECTION

PATENT NO. : 4,450,737

DATED : May 29, 1984

INVENTOR(S) : Dale Hitt

It is certified that error appears in the above-identified patent and that said Letters Patent is hereby corrected as shown below:

Column 6, line 7, "or" (second occurrence) should be -- of --.

Signed and Sealed this

Twenty-third Day of October 1984

[SEAL]

Attest:

GERALD J. MOSSINGHOFF

Attesting Officer

Commissioner of Patents and Trademarks